United States Patent

Foerster, Jr.

[11] Patent Number: 5,226,767
[45] Date of Patent: Jul. 13, 1993

[54] FASTENER DEVICE FOR BLIND-END MOUNTING

[76] Inventor: E. W. Foerster, Jr., 6001 S. Yosemite, A-104, Englewood, Colo. 80111

[21] Appl. No.: 828,519

[22] Filed: Jan. 31, 1992

[51] Int. Cl.$^5$ .................................................. F16B 21/00
[52] U.S. Cl. ...................................... 411/340; 411/342
[58] Field of Search .............. 411/342, 340, 341, 346, 411/344, 345, 349, 378, 386, 347, 913, 400, 401; 24/453; D8/385

[56] References Cited

U.S. PATENT DOCUMENTS

| | | | |
|---|---|---|---|
| D. 259,171 | 5/1981 | Wallace | D8/385 |
| 3,175,452 | 3/1965 | Leitner | 411/340 |
| 4,245,545 | 1/1981 | Freeman | 411/342 |
| 4,286,497 | 9/1981 | Shamah . | |
| 4,439,079 | 3/1984 | Losada . | |
| 4,573,844 | 3/1986 | Smith | 411/340 |
| 4,657,461 | 4/1987 | Smith | 411/340 |
| 4,865,501 | 9/1989 | Ferris | 411/340 |
| 4,943,253 | 7/1990 | Smith | 411/340 X |
| 5,082,215 | 1/1992 | Hutchison | 40/657 X |

FOREIGN PATENT DOCUMENTS

| | | | |
|---|---|---|---|
| 1084089 | 6/1960 | Fed. Rep. of Germany | 411/345 |
| 2249772 | 9/1973 | Fed. Rep. of Germany | 411/340 |
| 912009 | 7/1946 | France . | |
| 1045984 | 10/1966 | United Kingdom | 411/340 |

Primary Examiner—Rodney M. Lindsey
Attorney, Agent, or Firm—Timothy J. Martin; Dana S. Rewoldt

[57] ABSTRACT

The present invention is in the field of anchor bolt assemblies which are used as wall or ceiling mounts. The present invention includes a shaft with opposite first and second ends formed as a body and a neck joined at a shoulder. The body has a cross-section that is sized for close fitting insertion in the wall or ceiling. The neck extends longitudinally of the body to terminate in a second end. The neck cross-section is formed to have a longitudinal recess. The device also includes engagement means on the shaft for engaging a mounting element. A cross-piece having first and second arms is attached by hinge means to the shaft. The cross-piece is sized to fit within the longitudinal recess when the device is installed in the wall. Upon installation, the cross-piece snaps out of the recess and braces against the back of the wall or ceiling. The shaft maybe threaded or ratcheted.

18 Claims, 3 Drawing Sheets

FASTENER DEVICE FOR BLIND-END MOUNTING

FIELD OF INVENTION

The present invention generally relates to fasteners used in conjunction with mounting objects relative to the support. More particularly, however, the present invention is directed to that field of fasteners known as blind-end fasteners which are used where only one side of a support is readily accessible. Among this field of fasteners are anchor bolt assemblies which may be used as wall or ceiling mounts as well as in dwellings and other building structures.

BACKGROUND OF THE INVENTION

The variety of fasteners which have been developed for both general and specialized purposes is so vast as to defy ready description. The various types of nut and bolt assemblies, screws, rivets, nails, staples, etc. have long been used, for example, to: (1) fasten two objects together; (2) support or mount one object to another, including an object to a support surface; or (3) to extend through a support in order to retain the support together or otherwise strengthen the support. While the present invention generally relates to fasteners, the present invention specifically concerns blind-end fasteners.

When attempting to secure objects to supports, a person quite often encounters circumstances that afford physical access to only one side of a support. Where there is a desire to fasten or otherwise mount an object to the support, it is necessary to utilize a fastening device which only requires operative access at one end. Such devices may be referred as to blind-end fasteners since the securing of these fasteners may be accomplished on only that side of the support to which physical access is provided.

One type of blind-end fastener which is particularly related to the present invention are those devices known as anchor bolts which are adapted to fasten between opposite sides of a support through a bore or other opening formed therein. Such devices are often used in walls and ceilings of homes or other buildings and are adapted to fasten to wallboard, press board, peg board and the like. A fairly universal problem with these anchor bolts, though, is that they each typically require a bore or opening that is larger in size than the cross-sectional dimension of the bolt itself. By having an oversized opening, it is not unusual that the fastener becomes misaligned with respect to the axis of the opening. Furthermore, oversized openings in some instances reduce the structural integrity of the support and, should the fastener device be removed, the enlarged opening may require substantial cosmetic repair. Many of the existing anchor bolts are fairly complex in structure and thus expensive to produce and maybe difficult to install. Where expandable base anchors are used or where toggle type anchor bolts are employed, they each must be spaced a minimum distance from internal structures (such as vertical wall studs and horizontal braces between the studs) on the opposite or blind side of the support. This spacing is necessary to accommodate the expansion of the base or the physical dimension of the toggle nut employed by these fasteners. Another disadvantage of existing anchor bolts is the inability of many constructions to fasten onto thin wall supports. This is due to the physical dimension needed to allow the blind-end structure to operate after passage through the support. Further, there is a need for substantial interior space clearance after the base or the toggle nut expands due to the length of threaded penetration of the anchor bolt therethrough when the bold is tightened onto the support.

As a result of the disadvantages of previous anchor bolts, there have been attempts to improve anchor bolt constructions so as to reduce the relative size of the opening through which they must be inserted as well as to eliminate the problems of enlarged toggle nuts or expanding bases. One such example is found in U.S. Pat. No. 4,657,461 issued 14 Apr. 1987 to Smith. Here, a bolt and collet assembly is provided with the bolt adapted to extend through a support to the blind-side thereof while the collet is adapted to fasten onto the bolt to mount it within an opening in the support. The bolt is constructed as an elongated shaft having ridged teeth, threads or other fastening means on its exterior surface and the collet has interior structure to cooperatively engage the exterior ridged teeth or threads on the bolt. At the interior end or blind-end, the bolt is provided with a pair of arms connected to the end of the bolt with a goose-neck structure so that the arms are biased transversely of the bolt in the operative position but may be bent alongside the bolt when being inserted through the opening. Nonetheless, the teachings of this patent indicate that an opening substantially larger than the bolt cross-sectional dimension is still necessary to allow insertion of the bolt.

U.S. Pat. No. 4,439,079 issued 27 Mar. 1984 to Losada similarly discloses a pivoting cross-piece structure at the end of an anchor bolt. Here, however, the anchor bolt is formed by a pair of legs which may be bent with respect to one another thereby allowing pivoting of the cross-piece in a generally longitudinal direction. The cross-piece is in the form of a hinged, flat plate which will be oriented normally to the longitudinal axis of the bolt after insertion by the reorientation of the leg members. This device allows for insertion through an opening that is dimensioned substantially equal to the distance between the two bolt legs.

While not being directed to anchor-type bolts, U.S. Pat. No. 2,061,478 issued 17 Nov. 1936 to Pippin discloses a fastener in the form of a locking pin that has a pivotal cross-piece at the blind-end thereof. This cross-piece has a weighted arm which nests in a recess formed in the bolt shaft so that the locking pin maybe passed through an opening that is dimensioned substantially the same size as the cross-section of the bolt shaft. However, this locking pin relies upon the force of gravity allowing it to pivot about an axis formed by a U-shaped extension of the bolt. While this structure does allow for blind-side fastening, it can only be used in proper orientation, usually vertically, with respect to a gravitational field and therefore would have limited utility, if at all, as an anchor bolt.

Accordingly, there remains a need for improved fasteners of the anchor bolt-type which can mount between opposite sides of the support through an opening formed therein where access is accorded to only one side of the support. There is a distinct need for such fasteners that can pass through openings that are dimensioned of an approximate equal size to the dimension of the fastener itself, and there is a need for such fasteners that can be used despite the existence of internal structure on the blind-side of the support. There is a further need for fasteners which may be fastened to thin supports (as defined by the distance between its two sides).

SUMMARY OF THE INVENTION

It is an object of the present invention to provide a new and useful fastener which can mount through an opening in a support that is similar in physical dimension to the cross-section of the fastener.

Another object of the present invention is to provide a fastener which is simple to use so as to require a minimum of installation effort.

A further object of the present invention is to provide a fastener of integral one-piece construction which has improved resilient characteristics to be self-locking on the blind-side of the support.

Yet another object of the present invention is to provide a fastener device which permits mounting on a support of minimum thickness.

Still a further object of the present invention is to provide a blind-end fastener that can function within spaces of minimum clearance.

According to the present invention, then, a fastener is provided which is adapted to mount through an opening in a support that has opposite side and which is further adapted to receive a mounting element to fasten the fastener between the opposite sides of the support. Broadly, the fastener includes a shaft that has opposite first and second ends. The shaft has a body portion and a neck portion which are joined to one another at a shoulder. A longitudinal axis extends axially of the body portion from the first end to the shoulder, and the body portion has a body cross-section that is sized for close fitted insertion through the opening. The neck portion extends longitudinally of the body portion to terminate at the second end and has a neck cross-section that is reduced in size from the body cross-section so that a longitudinal recess is provided alongside the neck portion. This recess is defined to be the space between the neck portion and an imaginary surface formed as a geometric projection of the body cross-section along the longitudinal axis. Engagement structure is formed on the shaft in order to allow the mounting element to attach to the shaft in order to fasten the fastener, and a cross-piece is provided which has first and second arm portions extending oppositely one another from a midportion of the cross-piece. A hinge structure interconnects the cross-piece with the neck portion of the shaft at the second end, and the hinge structure acts to resiliently bias the cross-piece into a locked position wherein the cross-piece is oriented transversely to the longitudinal axis. The hinge also permits the cross-piece to move into an insertion position wherein a selected one of the first and second arms is oriented alongside the neck portion and another of the arms extends longitudinally of the shaft whereby the cross-piece and the neck portion can pass through the opening in the support.

In one general form of the present invention, the cross-piece is sized so that the selected arm portion which is located alongside the neck portion in the insertion position is sized to be completely received within the recess. Another feature of the present invention is that the engagement structure extends both along a portion of the length of the body portion and along the length of the neck portion to a location proximate the second end. This allows the mounting element to engage this shaft along the neck thereby permitting the fastener to work with supports of narrow thicknesses. In any event, it is preferred that the hinge structure be a living hinge.

In the more specific forms of the present invention, it is preferred that arm which is selected to be received in the recess completely nests therein and that the arm be configured whereby the combination of the neck and arm together have a periphery that is co-extensive with the imaginary surface formed as a projection of the body cross-section. This body cross-section can be either rectangular, circular or other geometric shape. Furthermore, the engagement structure may selectively be threads (where the body portion is circular in cross-section) or ratchet teeth.

The hinge, the cross-piece and the shaft are preferably formed integrally out of plastic so that the natural resiliency of the plastic provides the biasing force to bias the cross-piece into the locking position. Preferably this locking position is perpendicular to the longitudinal axis. Further, the first end of the shaft, opposite the cross-piece, may include a mounting structure which may be used to mount objects with respect to the support. Again, this mounting structure may be formed integrally with the shaft out of plastic material.

Where the body portion of the shaft is cylindrical, it is preferred that the neck portion be constructed by cutting away a portion of the body portion up to said shoulder so that the neck portion is offset with respect to the longitudinal axis. To this end, it is preferred to form a flat face parallel to the longitudinal axis and cut the recess a radial depth such that the neck cross-section is greater than one-half of the body section, that is, greater than semi-circular. This helps prevent disengagement of a threaded mounting element, such as a nut.

These and other objects of the present invention will become more readily appreciated and understood from a consideration of the following detailed description of the preferred embodiment when taken together with the accompanying drawings, in which:

DETAILED DESCRIPTION OF THE EXEMPLARY EMBODIMENTS

The present invention broadly concerns fasteners which are adapted to mount on support surfaces, especially support surfaces such as wall board, peg board, press board, and the like. Accordingly, the present invention is directed to a blind-end fastener which can be used to connect two such a support surface when access is only afforded to one side thereof. While this invention is described with respect to such blind-end fasteners, it should be understood, however, that this description is not to be interpreted as a limitation on the structure described and claimed herein.

Figure 1:
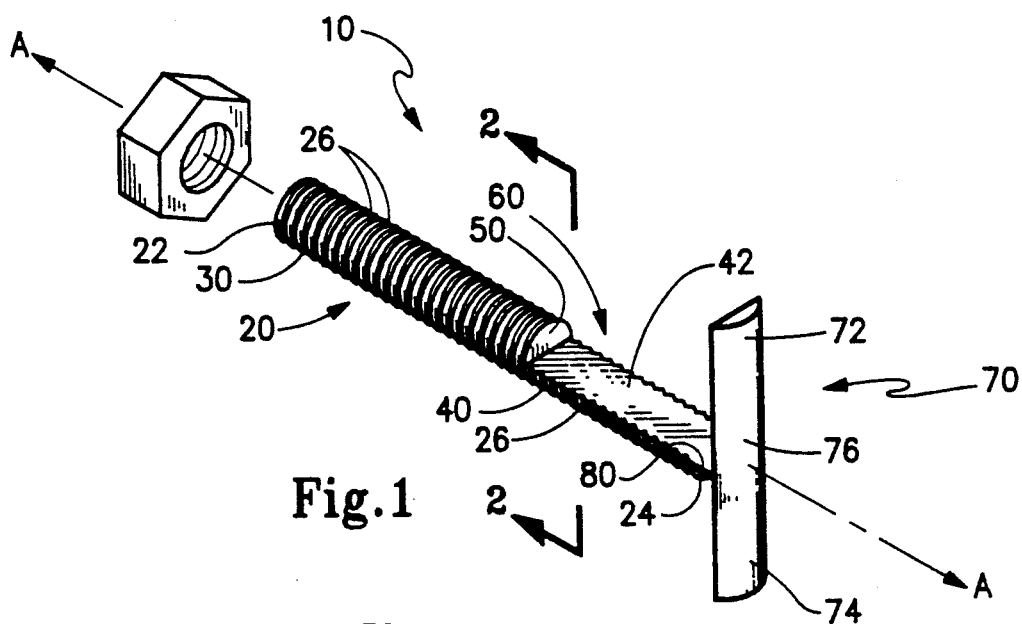
FIG. 1 s a perspective view of a first exemplary embodiment of the fastener according to the present invention used in conjunction with a cooperative mounting element.
Figure 2:
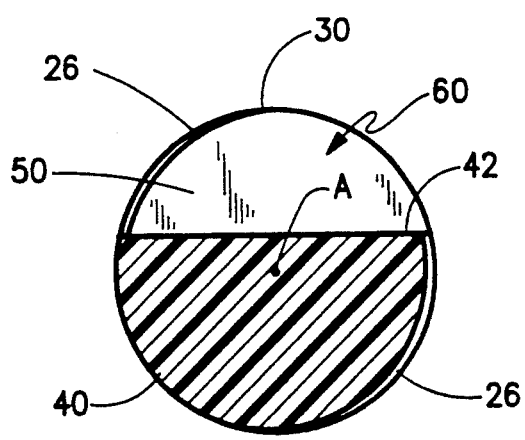
FIG. 2 is a cross-sectional view taken about lines 2—2 of FIG. 1.
Figure 3:
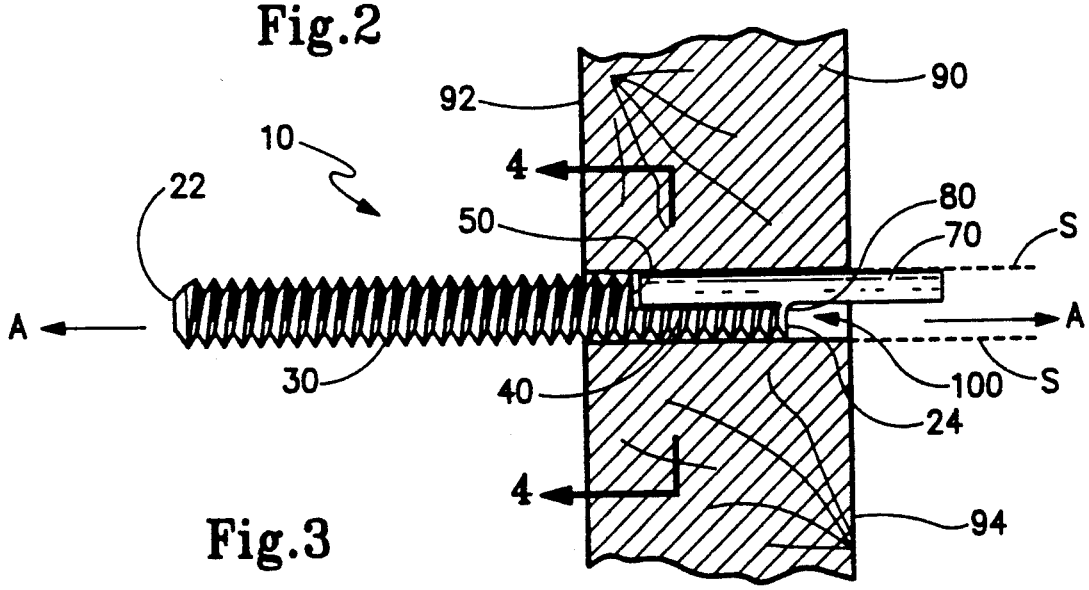
FIG. 3 is a side view in elevation showing the fastener device of FIG. 1 in an insertion position in a support.
Figure 4:
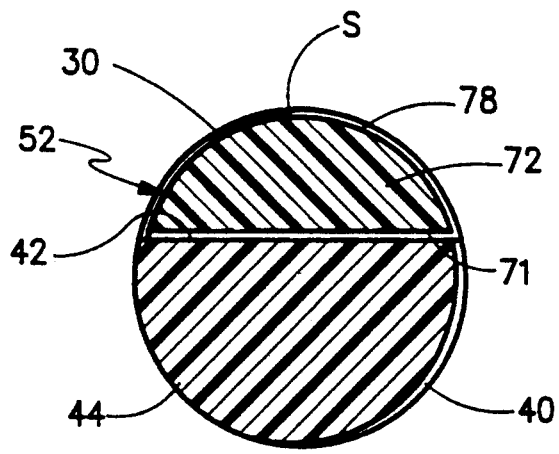
FIG. 4 is a cross-sectional view taken about lines 4—4 of FIG. 3.
Figure 5:
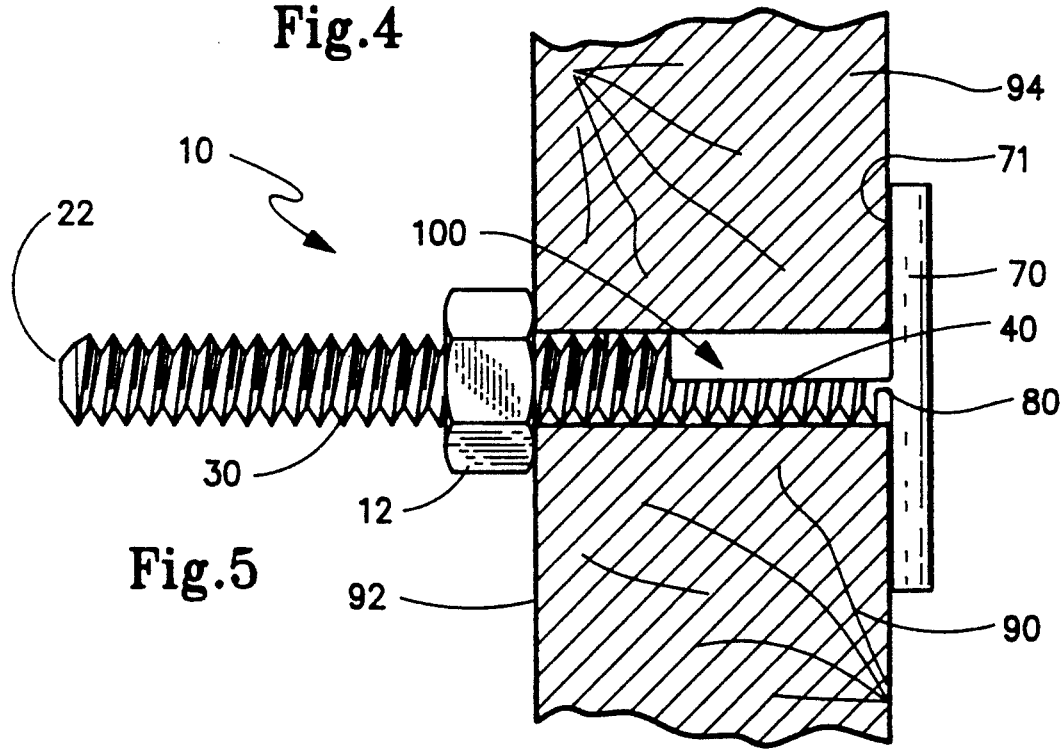
FIG. 5 is a side view in elevation similar to FIG. 3, but showing the fastener of the first exemplary embodiment in a locked position having a corroborative mounting element secured thereon.

A first exemplary embodiment of the present invention is accordingly shown in FIGS. 1-5. With respect to these figures, FIGS. 3 and 4 show the fastener in an insertion position wherein the fastener is inserted through a bore in a support. FIGS. 1 and 5 best show the fastener in a locking position. In these figures, then, it may be seen that fastener 10 is formed as a shaft 20 that has a first end 22 and a second end 24. Shaft 20 is provided with engagement means such as threads 26 so that shaft 20 may be engaged by a mounting element such as nut 12 which is threadably received thereon. Shaft 20 is formed by two portions, a body portion 30 and a neck portion 40 which are joined together at shoulder 50.

Body portion 20 has a longitudinal axis "A" which extends axially from first end 22 to shoulder 50. Furthermore, body portion 20 has a selected geometric cross-sectional configuration and dimension which may be projected as an imaginary surface "S" in the direction of longitudinal axis "A", as is shown in FIG. 3. In this first embodiment, body portion 30 is cylindrical in shape. Neck portion 40 extends longitudinal of body portion 30 and has a reduced cross-sectional dimension when compared with body portion 30. Thus, a longitudinal recess 60 is formed as the space located between flat face 42 of neck portion 40 and surface "S". In FIGS. 1-5, recess 60 is formed by a cut-away portion of cylindrical body portion 30 thereby to form neck portion 40 which is off-set from longitudinal axis "A" as shown in FIG. 3. Neck portion 40 preferably has a cross-sectional dimension that is slightly greater than semi-circular in shape, as in shown in FIGS. 2 and 4. In other words, the cross-section of neck portion 40 is greater than 50% of the cross-sectional dimension of body portion 30.

A cross-piece 70 is mounted on second end 42 of shaft 20 and is pivotal with respect thereto. Cross-piece 70 includes a first and second arm portions 72 and 74 which extend oppositely one another from a mid-portion 76 of cross-piece 70. Mid-portion 76 is thus secured to neck portion 40 by means of a hinge structure 80 located at second end 24. Hinge structure 80 permits cross-piece 70 to pivot between an insertion position shown in FIGS. 3 and 4, and a locking position shown in FIGS. 1, 4 and 5. It should be further appreciated that the hinge structure biases cross-piece 70 into the locking position. To this end, it is preferred that shaft 20, cross-piece 70 and hinge structure 80 be formed as an integral one-piece construction of resilient plastic material so that the resiliency of the plastic material biases cross-piece 70 into the locking position. Further, it is preferred that cross-piece 70 be in a perpendicular orientation to longitudinal axis "A" when in the locking position, although it is sufficient that cross-piece 70 be biased transversely to longitudinal axis "A" at an acute angle thereto. The tightening of the mounting element, such as nut 12, would then force cross-piece 70 into the locking position.

In use, fastener 10 may be placed in a position for insertion, as shown in FIG. 4, through a bore 100 formed in support 90. Here, support 90 has an exposed surface 92 and a hidden surface 94 which may not be accessible to the user of fastener 10. However, it should be understood that it is not required for surface 94 to be hidden in order to use fastener 10, but rather this description is provided to explain that it is not necessary for the user to have access to both sides of support 90 in order to secure fastener 10. In any event, it may be seen from FIG. 4 that bore 100 is dimensioned similarly to the cross-section of body portion 30 so that body portion 30 is sized for close-fitted insertion into bore 100. When cross-piece 70 is moved into the insertion position, first arm portion 72 is completely nested in recess 60 with second arm portion 74 projecting longitudinally of second end 24 so that cross-piece 70 and neck portion 40 may be inserted through bore 100 until shoulder 50 physically clears surface 94. At this point, the resilient biasing of hinge 80 causes cross-piece 70 to pivot towards the locking position so that fastener 10 cannot be withdrawn from bore 100. As is shown in FIG. 5, the mounting element, such as nut 12, may then be threaded onto body portion 30 so that support 90 is sandwiched between nut 12 and cross-piece 70.

As noted above, first arm portion 72 completely nests in recess 60. Accordingly, with reference to FIG. 4, it should be seen that the periphery 52 defined by the curved surface 44 of neck portion 40 and the curved surface 78 of arm portion 72 are co-extensive with surface "S" defined by the geometrical projection of the cross-section of body portion 30. To this end, it is preferred that cross-piece 70 have a flat face 71 both to abut flat face 42 of neck portion 40 and to abut hidden surface 94 of support 90, as shown in FIG. 5.

Further, with reference to the above-referenced FIGS. 1-5, it may be seen that threads 26 extend completely along both body portion 30 and neck portion 40 to terminate at a location on neck portion 40 proximate to second end 24. As shown in FIG. 2, neck portion 40 has a cross-section that is greater than one-half of the cross-section of body portion 30. Therefore, nut 12 may be matably threaded completely along both body portion 30 and neck portion 40 thereby allowing fastener 10 to be secured to a support 90 of relatively thin thickness. This advantage is not heretofore been known by prior art fasteners of the pivoting cross-piece type.

Figure 6:
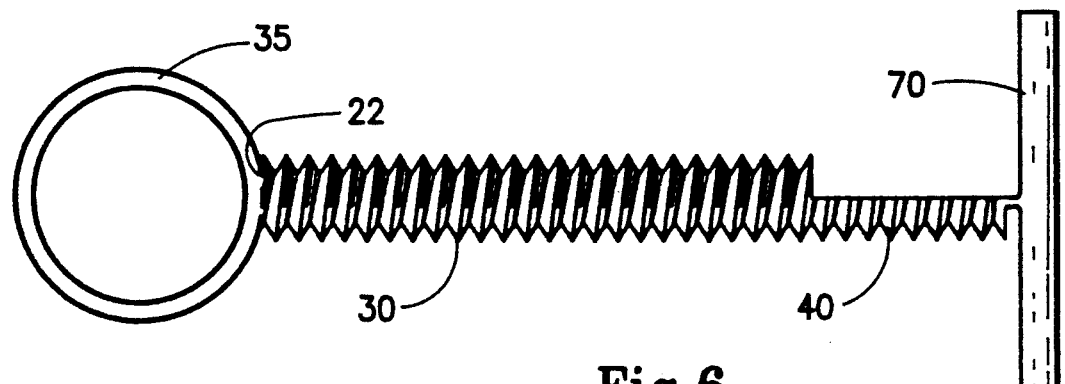
FIG. 6 is a side view in elevation of a second exemplary embodiment of the present invention that is similar to the first embodiment but which as a mounting structure opposite the cross-piece.

If desired, any excess protrusion of body portion 30 projecting outwardly of exposed surface 92 may be cut off after mounting of nut 12 on shaft 20. Alternately, as is shown in FIG. 6, first end 22 of shaft 20 may be provided with a mounting structure such as ring 35 to permit mounting of objects thereto. This mounting structure may take the form of ring 35 or such other such structures such as hooks, eyes, prongs, etc., all as is known in the art. Again, this mounting structure, such as ring 35, is formed integrally with shaft 20, cross-piece 70 and hinge structure 80.

Figure 7:
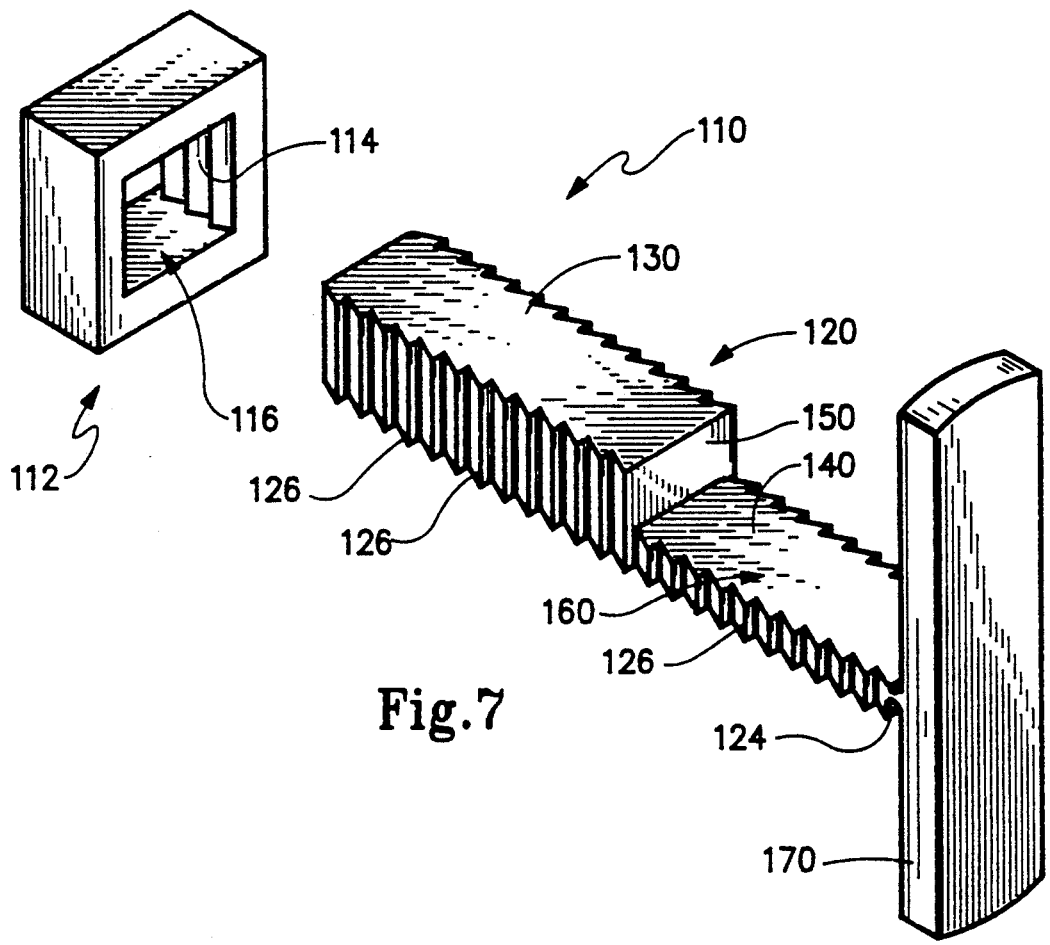
FIG. 7 is a perspective view of a second alternate embodiment of the fastener according to the present invention along with a mounting element therefor.
Figure 8:
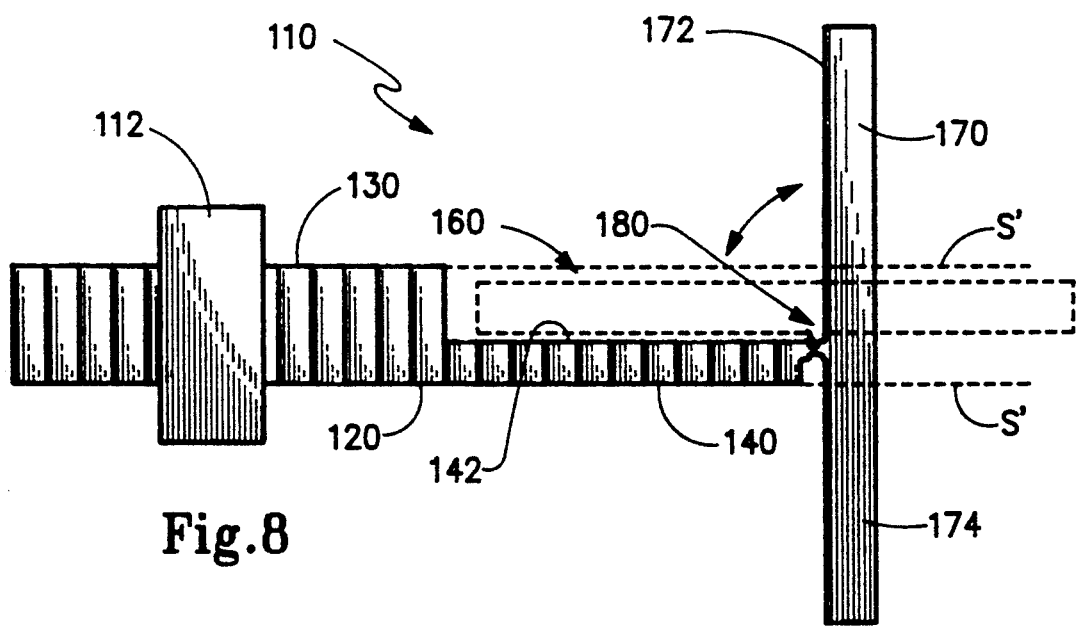
FIG. 8 is a side view of the second exemplary embodiment of the fastener of FIG. 6 with the mounting element secured thereon.

A third exemplary embodiment of the present invention is shown in FIGS. 7 and 8. This third embodiment is similar to the construction of the first and second embodiments shown in FIGS. 1-6, with several notable exceptions. First, it maybe seen in FIGS. 7 and 8 that fastener 110 has a shaft 120 with a body portion 130 formed in a rectangular cross-section which, in this instance, is square shaped. Likewise, neck portion 140 which extends longitudinally of body portion 130 at shoulder 150 has a rectangular cross-section and terminates at end 124 to which cross-piece 170 is pivotally attached. Due to the rectangular cross-section of shaft 120, the engagement means for nut 112 cannot be circular threads so that, instead, a plurality of rib-like teeth 126 extend completely along the longitudinal length of body portion 130 and neck portion 140 to mate with corresponding ratchet-teeth 114 in the interior of nut 112. To this end, nut 112 has a hole 116 sized slightly larger than the cross-section of body portion 130 so that nut 112 may slidably engage shaft 120 along its length.

Cross-piece 170 is again pivotally secured by a hinge structure 180 but, as is shown in FIG. 8, hinge structure 180 is a "living hinge" configuration as is known in the art. This configuration is to provide a strong hinge connection while avoiding fatigue that my occur as cross-piece 170 is pivoted. Further, as is shown in FIGS. 7 and 8, neck portion 140 has a smaller cross-sectional dimension than 50% of the cross-sectional dimension of body portion 130 so that recess 160, as again defined by the distance between flat face 142 of neck portion 140 and imaginary surface S', is greater than one-half of the cross-sectional dimension of body portion 130. This is permitted in this third embodiment since ratchet-teeth 114 will still lock onto teeth 126 on neck portion 140 due to the fact that the width of neck portion 140 has not been diminished. That is, where nut 112 is positioned on neck portion 140, it will still not disengage and thus securely fasten shaft 120. This increase in size of recess 160 permits easier nesting of arm portion 172 of cross-piece 170 in recess 160, as shown in phantom.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A fastener which is adapted to mount through an opening in a support that has opposite sides and which is adapted to receive a mounting element to fasten said fastener between the opposite sides of said support, comprising:

(a) a shaft having opposite first and second ends and formed as a body portion and a neck portion joined to one another at a shoulder, said body portion having a longitudinal axis extending axially from said first end thereof to said shoulder and having a body cross-section that is sized for close-fitted insertion through the opening said neck portion extending longitudinally of said body portion to terminate at said second end and having a neck cross-section of reduced size whereby a longitudinal recess is provided alongside said neck portion, the longitudinal recess being defined as a space located between said neck portion and an imaginary surface formed as a geometric projection of said body cross-section along the longitudinally axis;

(b) engagement means formed on said shaft for engaging said mounting element when said mounting element is received thereon said engagement means extending along said body portion from a first location and along said neck portion to a second location proximate the second end whereby said mounting element may be mounted onto said first end and selectively secured longitudinally along both said body and neck portions;

(c) a crosspiece including first and second arm portions extending oppositely one another from a mid-portion of said crosspiece, said crosspiece and said shaft formed as a one piece construction; and (d) hinge means for interconnecting the mid-portion of said crosspiece to the second end of said shaft and for resiliently biasing said crosspiece into a locking position wherein said crosspiece is oriented transversely to the longitudinal axis, said hinge means permitting said crosspiece to be moved into an insertion position wherein a selected one of said first and second arms is oriented alongside said neck portion and another of said first and second arms extends longitudinally of said shaft whereby said crosspiece and said neck portion can pass through the opening in said support.

2. A fastener according to claim 1 wherein the selected one of said first and second arms is completely nested in the recess when said crosspiece is in the insertion position whereby said crosspiece and said neck portion can pass through the opening when the opening is dimensioned similarly to said body cross-section.

3. A fastener according to claim 2 wherein said selected one of said first and second arms is dimensioned similarly to the recess so that, when in the insertion position, said neck portion and said selected one of said first and second arms have a periphery that is coextensive with the imaginary surface.

4. A fastener according to claim 1 wherein said body portion is rectangular in cross-section.

5. A fastener according to claim 1 wherein said body portion is circular in cross-section.

6. A fastener according to claim 5 wherein said engagement means comprises threads.

7. A fastener according to claim 1 wherein said engagement means comprises ratchet teeth.

8. A fastener according to claim 1 wherein said hinge means is a living hinge structure, said crosspiece, said shaft and said living hinge structure being formed integrally with one another.

9. A fastener according to claim 1 including a mounting structure on the first end of said shaft and operative in use to mount objects with respect to said support.

10. A fastener according to claim 1 wherein said cross-piece is oriented perpendicularly to the longitudinal axis to define the locking position.

11. A fastener which is adapted to mount through an opening in a support that has opposite sides and which is adapted to receive a mounting element to secure said fastener between the opposite sides of said support, comprising:

(a) a shaft having opposite first and second ends and formed as a body portion and a neck portion joined to one another at a shoulder, said body portion having a longitudinal axis extending axially from said first end thereof to said shoulder and having a body cross-section said neck portion extending longitudinally of said body portion to terminate at said second end and having a neck cross-section of reduced size whereby a longitudinal recess is provided alongside said neck portion, the longitudinal recess being defined as a space located between said neck portion and a imaginary surface formed as a geometric projection of said body cross-section along the longitudinal axis;

(b) engagement means on said shaft for engaging said mounting element when said mounting element is received thereon;

(c) a crosspiece including first and second arm portions extending oppositely one another from a midportion of said crosspiece; and (d) a living hinge structure interconnecting the midportion of said crosspiece to the second end of said shaft, said living hinge structure formed integrally with said crosspiece and said shaft and operative to resiliently bias said crosspiece into a locking position wherein said crosspiece is oriented transversely to the longitudinal axis and to permit said crosspiece to be moved into an insertion position wherein a selected one of said first and second arms is oriented alongside said neck portion and another of said first and second arms extends longitudinally of said shaft whereby said crosspiece and said neck portion can pass through the opening in said support.

12. A fastener which is adapted to mount through an opening in a support that has opposite sides and which is adapted to receive a mounting element to secure said fastener between the opposite sides of said support, comprising:

(a) a shaft having opposite first and second ends and formed as a body portion and a neck portion joined to one another at a shoulder, said body portion having a longitudinal axis extending axially from said first end thereof to said shoulder and having a body cross-section that is sized for close-fitted insertion through the opening, said neck portion extending longitudinally of said body portion to terminate at said second end and having a neck cross-section of reduced size whereby a longitudinal recess is provided alongside said neck portion, the longitudinal recess being defined as a space located between said neck portion and a imaginary surface formed as a geometric projection of said body cross-section along the longitudinal axis;

(b) engagement means formed on said body portion for engaging said mounting element when said mounting element is received thereon;

(c) a crosspiece including first and second arm portions extending oppositely one another from a midportion of said crosspiece; and (d) hinge means for interconnecting the mid-portion of said crosspiece to the second end of said shaft and for resiliently biasing said crosspiece into a locking position wherein said crosspiece is oriented transversely to the longitudinal axis, said hinge means permitting said crosspiece to be moved into an insertion position wherein said first and second arms are oriented parallel to the longitudinal axis with a selected one of said first and second arms being completely nested in the recess whereby said crosspiece and said neck portion can pass through the opening when the opening is dimensioned similarly to said body cross-section.

13. A fastener according to claim 12 wherein said neck portion is formed as a longitudinal extension of said body portion with a portion thereof cut away to form said recess so that said neck portion is offset with respect to the longitudinal axis.

14. A fastener according to claim 13 wherein said neck portion has a flat face formed parallel to said longitudinal axis with said neck cross-section being greater than one-half of the body cross-section.

15. A fastener according to claim 14 wherein said first and second arms are dimensioned similarly to the recess so that, when in the insertion position, said neck and said selected one of said first and second arms have a periphery that is coextensive with the imaginary surface.

16. A fastener according to claim 14 wherein said engagement means extends along said body portion from a first location and along said neck portion to a second location proximate the second end whereby said mounting element may be selectively secured longitudinally along both said body and neck portions.

17. A fastener according to claim 12 wherein said hinge means is a living hinge structure, said crosspiece, said shaft and said living hinge structure being formed integrally with one another.

18. A fastener according to claim 12 including a mounting structure on the first end of said shaft and operative in use to mount objects with respect to said support.

* * * * *